Patented July 3, 1945

2,379,728

UNITED STATES PATENT OFFICE 2,379,728

METHODS OF PREPARING POLYMERIZATION PRODUCTS

Eugene Lieber, West New Brighton, Staten Island, N. Y., and Harry T. Rice, Roselle, N. J., assignors to Standard Oil Development Company, a corporation of Delaware No Drawing. Application October 24, 1941, Serial No. 416,352

6 Claims. (Cl. 260—683.15)

This invention relates to methods of preparing polymerization products and using them for various purposes, more particularly as pour depressors in waxy lubricating oils.

It has long been known that unsaturated hydrocarbons of the olefin class are capable of being polymerized to high molecular weight oily products, especially in the presence of active polymerization catalysts of the Friedel-Crafts type, such as aluminum chloride. It has also been known for some time that pour depressors, i. e., products which are capable of lowering the pour point of waxy mineral lubricating oils when added thereto in small amounts, can be produced by Friedel-Crafts condensation of high molecular weight aliphatic compounds, such as chlorinated paraffin wax or olefins derived therefrom, by a non-cracking removal of hydrogen chloride, with aromatic compounds, such as naphthalene. In fact it has generally been considered necessary for the production of pour depressors by practically any method to use compounds containing at least some long-chained aliphatic groups. Furthermore, the polymerization of olefins, obtained by cracking paraffin wax, produces oily products, but these do not have pour-depressing properties.

In spite of, and practically contrary to the teachings of the prior art, a method has now been found for making pour depressors by polymerization of low molecular weight olefins per se. Accordingly, it is one object of this invention to make pour depressors from low molecular weight olefins without the use of any high molecular weight aliphatic compounds and without any aromatic compounds.

Broadly, this invention comprises the polymerization of lower olefins without using continuous or vigorous agitation. If desired, the reaction can be carried out by merely allowing the olefin to stand in contact with the catalyst until the reaction is substantially complete, or at most, only a slight agitation may be used at occasional intervals. In fact it has been found that by using identically the same materials which give good pour-depressing results under semi-quiescent conditions, under conditions of continuous and uniform stirring, an oily polymerization product having substantially no pour-depressing properties at all is produced. This highly unexpected result is a significant discovery and an important contribution to the art of producing pour depressors.

The olefins to be used according to this invention may be any of the low-boiling, low molecular weight aliphatic olefins having the general formula $R-CH=CH-R'$, where $R$ and $R'$ may be the same or dissimilar and represent either hydrogen or an alkyl group, the sum total of the carbon atoms in the olefin being less than 10. Examples of suitable olefins includes amylenes, hexylenes, butylenes, propylene, and ethylene. $R$ and $R'$ may be straight-chained or branched. Individual, pure olefins or mixtures thereof may be used; and commercial mixtures of low-boiling olefins, such as volatile cracked gasoline, mixed amylenes, etc., or mixtures of low-boiling aliphatic hydrocarbons containing substantial quantities of lower olefins, such as the so-called $C_4$ cut, etc., may be used. It is particularly desirable to use olefins having not more than 6 carbon atoms.

As the polymerization catalyst, aluminum chloride is preferred due to its low cost and availability as well as its polymerization efficiency. However, if desired, one may also use other types of Friedel-Crafts catalysts, such as boron fluoride, zinc chloride, iron chloride, titanium chloride, and the like.

Although it is actually unnecessary to use a solvent in carrying out the invention, yet at least under some circumstances the use of a solvent is helpful in producing a pour depressor of superior potency. As solvent, kerosene may be used and this may be absolutely inert, if desired, (e. g., a kerosene which has been heavily pretreated with concentrated sulfuric acid or with aluminum chloride in order to render it inert). Although a hydrocarbon solvent, such as a refined kerosene is preferred, it is also possible to use other types of solvents, such as ethylene dichloride, tetrachlorethane, nitrobenzene, etc.

The proportions of materials to be used may vary over a substantial range without departing from the broad scope and spirit of the invention. For instance, the amount of catalyst to be used may be within the approximate limits of .05 and 0.5 mol, preferably between 0.1 and 0.2 mol, per mol of olefins used. If a solvent is used, the amount thereof may be any reasonable amount up to 5 or more volumes per volume of olefins used, although generally it is preferred to use a lesser amount such as about ½ volume to 2 volumes of solvent per volume of olefins.

The temperature to be used in carrying out the reaction will depend to some extent on other factors, such as the amount of aluminum chloride and of solvent, but will normally range from about room temperature up to 200° F., or slightly more. Satisfactory results are obtained by adding aluminum chloride to the olefins, preferably in the liquid phase, under a reflux condenser, and after the aluminum chloride is added, by heating the mixture to a suitable temperature, such as 150° F., or so. The reaction time will, of course, depend partly on the temperature and partly on the proportions of materials, but it will usually range from less than an hour to 10 hours, or more, but usually between about 1 and 5 hours.

Although various orders of mixing the materials may be used, a satisfactory procedure is to add the aluminum chloride or other catalyst directly into the olefins, or into a solution of the olefins in a suitable solvent.

In carrying out this invention, it is an important requirement that the reaction mixture not be stirred very much, and if at all, only at occasional intervals. Although the mechanism of the reactions involved in this invention is not well understood because both with and without stirring polymerization takes place but the products are different, it is believed that in some manner the quiescent or semi-quiescent reaction conditions induce or permit the formation of higher molecular weight polymers and favor the formation of polymerization products having a chemical structure peculiarly adapted to cause pour depressing. Since the amount of actual stirring depends both on the vigorousness as well as the amount of time during which the stirring takes place, it is difficult to put actual limits on the maximum frequency of stirring, but as a general guide it is recommended that if any stirring is used at all, it should not be more than a slight stirring at intervals no more frequent than about 60 minutes. If an olefin such as ethylene is used in the gaseous phase, it must be fed in extremely slowly and preferably in the form of very fine bubbles, e. g., having a diameter not larger than $\frac{1}{16}$ of an inch, for instance by feeding the gas in through a porous alundum thimble; in other words, it is necessary that the gas be fed slowly enough to prevent any substantial stirring of the reaction liquid.

During the reaction, especially during the addition of the anhydrous aluminum chloride, the flask or other vessel used for carrying out the reaction may be cooled by suitable means, such as by running water on the outside thereof or through cooling coils, to prevent excessive rise in temperature.

After the polymerization reaction is completed, it is preferable, although not absolutely necessary, to cool the reaction mixture to about 125° F., or even to 100° F., and it is then preferably diluted with a suitable diluent, such as refined kerosene, and then neutralized or hydrolyzed by pouring it into water, dilute caustic soda or other suitable aqueous media, or alcohol, or a suitable mixture thereof, such as a mixture of alcohol and water. After settling and removal of the catalyst sludge layer, the dilute extract is then subjected to distillation as with fire and steam to an elevated temperature such as 600° F., or by a more or less equivalent vacuum distillation, in order to remove solvent and low-boiling materials. The distillation bottoms or residue comprises the desired polymerization product, which is usually a viscous oil having a green, brown, or mixed brown-green color. This oily product is soluble in mineral oils, and has good wax-modifying properties. It has a substantially high molecular weight, in the approximate range of about 500–2000; and as a result of the method for recovering it, it must necessarily be substantially nonvolatile at all temperatures up to about 600° F. under fire and steam distillation. When the wax-modifying properties of this new polymerization product are to be used for depressing the pour point of waxy mineral lubricating oils, the amount of the wax modifier to be used should normally be within the approximate limits of .05–10%, preferably between about 0.2% and 5.0%, very good results having been obtained with about 2% of the addition agent. The oils to which this wax modifier may be added are preferably those of the Pennsylvania type or other paraffinic type, or they may be fractions derived from naphthenic or mixed base crudes, especially fractions thereof obtained by solvent extraction. A small amount of this wax modifier is also useful as a dewaxing aid for removing wax from mineral lubricating oils of undesirably high wax content. In similarly small amounts, this wax modifier may also be incorporated into paraffin wax per se or compositions containing the same to be used for various purposes such as for coating or impregnating paper, or for making various molded products. This novel polymerization product may also, if desired, be used in other petroleum fractions, such as gasoline, kerosene, fuel oils, Diesel fuels, etc.

For the sake of illustration, but without intending the invention to be limited to the particular materials used, the following table is submitted showing experimental data obtained in a series of tests carried out by adding aluminum chloride to a quantity of mixed amylenes contained in a one-liter round bottom flask fitted with a reflux condenser, either alone or together with a solvent in the certain cases indicated, the reaction mixture being heated to about 150° F. after addition of the aluminum chloride and maintained thereat without agitation for three hours, the high molecular weight polymerization product being recovered as described above.

| | Mixed amylenes, gms. | AlCl$_3$ gms. | Solvent | | Yield, gms. | A. S. T. M.[1] pour point, °F. |
|---|---|---|---|---|---|---|
| | | | Kind | Cc. | | |
| 1 | 300 | 60 | | | 55 | −10 |
| 2 | 300 | 90 | | | 38 | −5 |
| 3 | 150 | 30 | C$_2$H$_4$Cl$_2$ | 150 | 48 | 0 |
| 4 | 150 | 30 | C$_6$H$_5$NO$_2$ | 150 | 34 | −5 |
| 5 | 150 | 30 | C$_2$H$_2$Cl$_4$ | 150 | 91 | −15 |
| 6 | 150 | 30 | Kerosene[2] | 150 | 47 | −25 |

[1] Figures given indicate pour point of 2% blend in paraffinic lubricating oil base stock having a pour point of +30° F.
[2] The kerosene used here was heavily pretreated with concentrated sulfuric acid in order to render it inert.

The above data show that by the present invention pour depressors capable of reducing the pour point, for instance, of a waxy lubricating oil having a pour point of +30° F. down to various temperatures ranging from 0° F. to −25° F. are produced. These are quite remarkable and unexpected results in view of the fact that heretofore no pour depressors of any type had ever ben produced from low molecular weight olefins as the sole starting material. The table also indicates that the type of solvent used has some effect on the potency of the pour depressor produced, ethylene dichloride giving substantially better results than tetrachlorethane, but the highly refined and inert kerosene giving still better results. The results obtained with ethylene dichloride and with the inert kerosene, particularly the latter, were both better than those obtained without any solvent.

It is not intended that this invention be limited to any of the specific examples which have been given merely for the sake of illustration nor unnecessarily by any theory as to the mechanism of the operation of the invention, but only by the appended claims in which it is intended to claim all novelty inherent in the invention as well as equivalents coming within the scope or spirit of the invention.

We claim:

1. The process which comprises polymerizing aliphatic olefins having less than 10 carbon atoms per molecule in liquid phase with about .05–0.5 mol of a Friedel-Crafts catalyst per mol of olefin at a temperature not substantially above 200° F. without more stirring than a slight stirring at intervals no more frequent than about 60 minutes, and recovering from the reaction products a viscous oil having wax-modifying properties.

2. Process according to claim 1 in which the polymerization is carried out without any stirring.

3. The process which comprises adding to an aliphatic olefin liquid containing less than 10 carbon atoms per olefin molecule a small amount of Friedel-Crafts catalyst sufficient to cause polymerization of said olefin liquid, and maintaining the resultant mixture at polymerization temperature without stirring until a viscous oil is produced which has pour-depressing properties when added to waxy mineral lubricating oils in small amounts, and separating the desired pour depressor from the reaction products.

4. Process according to claim 3 in which an inert solvent is also present during the polymerization.

5. The process which comprises dissolving about 1 mol of lower aliphatic olefin having less than 10 carbon atoms in about ½–5 volumes of an inert solvent, said olefin being the only reactant present, adding slowly to said solution about .05–0.5 mol of a Friedel-Crafts polymerization catalyst, maintaining the resultant mixture below a temperature of about 200° F. without more stirring than a slight, intermittent stirring at intervals no more frequent than about 60 minutes until said olefin liquid has polymerized to a viscous oil, hydrolyzing and removing the catalyst, and distilling the polymerization products to obtain as distillation residue a viscous oil having pour-depressing properties.

6. The process which comprises dissolving mixed amylenes in an inert hydrocarbon solvent in a reaction vessel fitted with a reflux condenser, using about ½–5 volumes of solvent per volume of mixed amylenes, said amylenes being the only reactants present, adding slowly to the resultant solution about 0.1–0.2 mol of aluminum chloride per mol of mixed amylenes and maintaining said reaction mixture at a polymerization temperature between the approximate limits of 60° F. and 150° F., without more stirring than a slight stirring at intervals no more frequent than about 60 minutes until said mixed amylenes have been polymerized to a viscous oil having pour-depressing properties, cooling and diluting the reaction mixture with an inert solvent, hydrolyzing and removing the aluminum chloride catalyst, and distilling the inert hydrocarbon solvent solution of the polymerization product with fire and steam to about 600° F. to obtain as distillation residue a viscous oil having pour-depressing properties.

EUGENE LIEBER.
HARRY T. RICE.